United States Patent [19]

Taylor

[11] 4,389,045
[45] Jun. 21, 1983

[54] LIQUID ENERGY ABSORBER DEVICE

[75] Inventor: Douglas P. Taylor, North Tonawanda, N.Y.

[73] Assignee: Tayco Developments, Inc., North Tonawanda, N.Y.

[21] Appl. No.: 342,799

[22] Filed: Jan. 26, 1982

Related U.S. Application Data

[63] Continuation of Ser. No. 115,949, Jan. 28, 1980, abandoned.

[51] Int. Cl.³ .................... B60G 13/00; B60G 15/00; F16F 9/00; F16F 11/00
[52] U.S. Cl. ................................ 267/8 R; 188/274; 267/140.1; 267/152
[58] Field of Search ................. 267/8 R, 35, 152, 130, 267/122, 121, 119, 138–140, 141.4, 141.5, 141.6, 140.5, 140.1, 141.1, 141, 64.19, 64.27, 140.4; 188/274

[56] References Cited

U.S. PATENT DOCUMENTS

| | | | |
|---|---|---|---|
| 286,042 | 10/1883 | Mayall | 267/35 |
| 2,917,318 | 12/1959 | Nallinger | 280/104 |
| 3,722,640 | 3/1973 | Taylor | 188/316 |
| 3,729,101 | 4/1973 | Brambilla et al. | 267/35 |
| 3,795,390 | 3/1974 | Kendall et al. | 267/35 |
| 3,795,418 | 3/1974 | Barenyi et al. | 267/35 |
| 3,819,167 | 6/1974 | Nakamura et al. | 267/35 |
| 3,933,344 | 1/1976 | Taylor | 267/64 A |
| 3,948,498 | 4/1976 | Hirano | 267/35 |
| 4,005,858 | 2/1977 | Lochner | 267/152 |

FOREIGN PATENT DOCUMENTS

| | | | |
|---|---|---|---|
| 1266569 | 4/1968 | Fed. Rep. of Germany | 267/152 |
| 2305725 | 8/1973 | Fed. Rep. of Germany | 267/35 |
| 1277125 | 1/1961 | France | 267/35 |
| 895798 | 5/1962 | United Kingdom | 267/8 R |
| 906550 | 9/1962 | United Kingdom | 267/35 |
| 1085157 | 9/1967 | United Kingdom | 267/35 |
| 1210016 | 10/1970 | United Kingdom | 267/152 |
| 1440997 | 6/1976 | United Kingdom | 267/152 |

Primary Examiner—Douglas C. Butler
Attorney, Agent, or Firm—Joseph P. Gastel

[57] ABSTRACT

A liquid energy absorber device including an elongated liquid energy absorber member mounted on a base, an annular elastomeric member also mounted on the base in surrounding relationship to the liquid energy absorber member, a sleeve mounted on the liquid energy absorber member for sliding movement, a plate connected to the sleeve and supported on the end of the annular elastomeric member remote from the base, grooves in the plate and in the portion of the sleeve facing the liquid energy absorber member to conduct atmospheric air to a space which is formed between the sleeve and the elastomeric member as the latter distorts in operation to thereby cool the liquid energy absorber member and the annular elastomeric member, with the annular elastomeric member being longer than the liquid energy absorber member so that there is deflection of the annular elastomeric member prior to the activation of the liquid energy absorber member.

16 Claims, 4 Drawing Figures

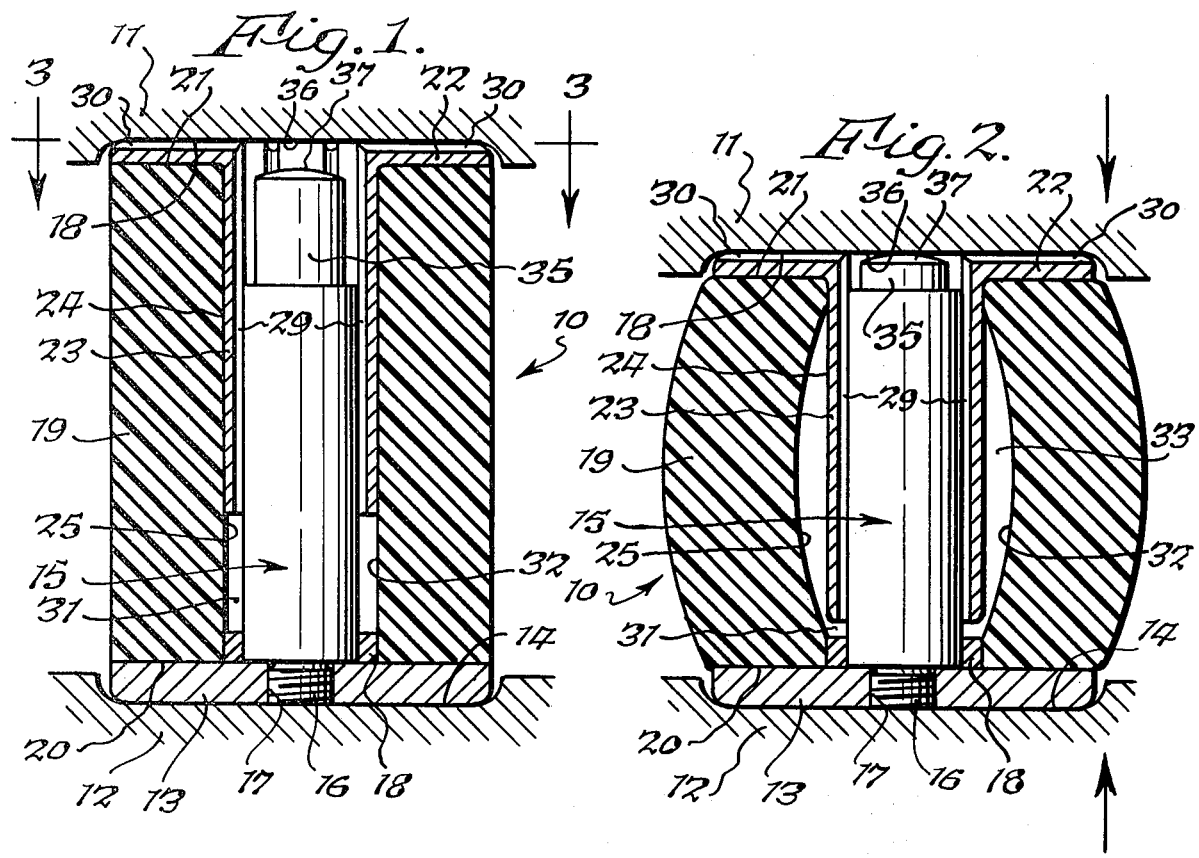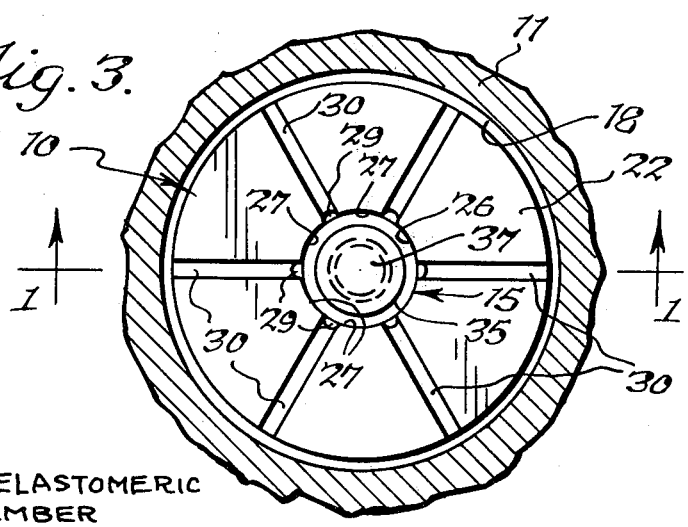

LIQUID ENERGY ABSORBER DEVICE

This is a continuation of application Ser. No. 115,949 filed on Jan. 28, 1980, now abandoned.

BACKGROUND OF THE INVENTION

The present invention relates to an improved liquid energy absorber device having a high spring rate and short travel for use in applications having limited space, such as in the suspension of an industrial inplant truck.

By way of background, an industrial inplant truck used in warehouses needs a spring type of suspension system to absorb impact from irregularities in the floor, such as bumps and floor joints. In trucks of this type, the axles and frames are of established designs and they normally use coil springs which have a low spring rate to attenuate impact. This relatively low spring rate was dictated by the limited space for the spring and the physical parameters of the spring material. The foregoing caused the spring to have long travel, which was highly undesirable because it resulted in unacceptable pitching of the truck with the attendant potential for spilling its load. Therefore, in the past the compression of the spring, of necessity, was limited to short travel by positive stops to achieve stability against excessive pitching, and this, in turn, many times resulted in bending or breaking of the truck axles due to bottoming. Furthermore, the shock of the bottoming of the frame against the axles sometimes caused rupture of the batteries used to power the truck. In contrast to the use of prior springs having a low spring rate with long travel, it is desirable, in inplant industrial trucks, to have a suspension which has a high spring rate which will attenuate impact and which will have a short travel which will obviate excessive pitching. However, in view of the fact that there is limited space for the springs in inplant industrial trucks, the desired objective has been incapable of achievement in the past.

SUMMARY OF THE INVENTION

It is accordingly one object of the present invention to provide an improved energy absorber device which is capable of being installed in a limited space and which will provide a high spring rate and a short travel and which will have substantial capacity for attenuating impact.

Another object of the present invention is to provide an improved energy absorber device which is a composite of an elastomeric spring and a liquid energy absorber and which will provide a high spring rate with short travel and can be installed in a limited space to attenuate impact.

A further object of the present invention is to provide a composite liquid energy absorber device including an elongated liquid energy absorber member and an annular elastomeric member surrounding said liquid energy absorber member so as to obtain the composite spring rate of both and in addition to inherently provide cooling to the liquid energy absorber member and the annular elastomeric member incidental to the distortion of the elastomeric member, to thereby prolong the useful life of the liquid energy absorber member and the elastomeric member. Other objects and attendant advantages of the present invention will readily be perceived hereafter.

The present invention relates to a liquid energy absorber device comprising an elongated liquid energy absorber member, an annular elastomeric member surrounding said liquid energy absorber member in an axial direction, a variable size space formable between said liquid energy absorber member and said annular elastomeric member as a result of distortion of said elastomeric member resulting from the changes in loading thereon, and duct means for effecting communication between said space and the atmosphere for causing cooling air to be pumped from the atmosphere to said space in response to the distortion of said elastomeric member for cooling said liquid energy absorber member and the elastomeric member. The present invention will be more fully understood when the following portions of the specification are read in conjunction with the accompanying drawings wherein:

BRIEF DESCRIPTION OF THE DRAWINGS

FIG. 1 is a fragmentary cross sectional view taken substantially along line 1—1 of FIG. 3 and showing the improved liquid energy absorber device in its normal unstressed condition;

FIG. 2 is a fragmentary cross sectional view similar to FIG. 1 showing the improved liquid energy absorber device under load;

FIG. 3 is a fragmentary plan view taken substantially along line 3—3 of FIG. 1; and FIG. 4 is a graph plotting the loading force against the deflection of the energy absorber device.

DESCRIPTION OF THE PREFERRED EMBODIMENT

The improved liquid energy absorber device 10 of the present invention is intended to be used as a combination shock absorber and spring mounted between frame 11 and axle 12 of a vehicle such as an industrial inplant truck. A circular base plate 13 is mounted in recess 14 of axle 12. A liquid energy absorber member 15 includes a screw-threaded portion 16 which is threadably received in tapped bore 17 of base 13. Liquid energy absorber member 15 may have the structure, such as shown in U.S. Pat. Nos. 3,722,640 or 3,933,344, both of which are incorporated herein by reference. Essentially, liquid energy absorber 15 is a combined liquid shock absorber device which includes both a liquid spring and a liquid shock absorber. Alternatively, if desired it may comprise solely a liquid spring or solely a liquid shock absorber. Accordingly, it is being designated as a liquid energy absorber device, which can be a liquid spring or a liquid shock absorber or a combination of both. However, as a minimum, liquid energy absorber 15 should include some type of internal spring mechanism for resetting the device from the position shown in FIG. 2 to the position shown in FIG. 1.

An annular cylindrical elastomeric member 19, which is preferably fabricated from polyurethane or similar material, encircles liquid energy absorber device 15 in an axial direction. A first end 20 of member 19 is mounted on base 13 and its opposite end 21 supports plate or flange 22 which is formed integrally with cylindrical sleeve 23, the outside 24 of which is received in bore 25 of member 19. End 20 of member 19 may be suitably secured to base 13, as by adhesive or suitable fasteners. Plate 22 is received in recess 18 of frame 11. The inside surface 26 of sleeve 23 includes a plurality of segments 27 which are separated by grooves 29 which extend the entire length of sleeve 23. Grooves 29 function as air ducts, and the upper ends of grooves 29 are in communication with radial grooves 30 in plate 22. The lower ends of grooves 29 are in communication with annular space 31 between the outside surface of liquid energy absorber member 15 and the inside surface 32 of elastomeric member 19. Space 31 functions as a duct, and it is of variable size, as can be seen from a comparison of FIGS. 1 and 2. An annular spacer 18 fits between the lower portions of member 19 and energy absorber 15 proximate base 13 for the purpose of maintaining a spaced relationship therebetween.

When the liquid energy absorber device 10 is used as a part of a suspension for an industrial inplant truck or the like, it will assume the configuration of FIG. 1 when it is under normal load wherein it only supports the vehicle, or it may be slightly distorted to a position where elastomeric member 19 bows slightly outwardly. However, during operation, as the platform truck encounters irregularities in the floor over which it travels, the elastomeric member 19 will distort so that it alternately assumes positions between those shown in FIGS. 1 and 2, depending on the amount of bumping force to which it is subjected. Thus, in the position shown in FIG. 2, a space 33 will be formed between the inner surface 25 of the elastomeric member 19 and the outer surface 24 of sleeve 23. When this occurs, air will be drawn from the atmosphere, through ducts 30, ducts 29, and duct 31 into space 33. The rush of air into space 33 through grooves 29 will cool the outer surface of liquid energy absorber member 15. When the elastomeric member 19 returns toward the position shown in FIG. 1, the air will be expelled from chamber 33 via duct 31, ducts 29, and ducts 30. The constant pumping action which accompanies distortion of elastomeric member 19 will provide cooling to liquid energy absorber member 15, as well as to the inner surface of elastomeric member 19.

It can be seen from FIG. 1 that the total height of the fully extended liquid energy absorber member 15, including its cylinder 34 and its piston 35, is less than the total height of elastomeric member 19. Therefore, as the liquid energy absorber device 15 is loaded and the undersurface 36 of recess 18 of frame member 11 approaches the top 37 of piston 35, the elastomeric member 19 will start to distort to absorb the loading. This is represented by portion of graph 39 between points O and A in FIG. 4, wherein line 39 represents the force-deflection curve of the annular elastomeric member 19 taken by itself. It is to be especially noted that annular elastomeric member 19 provides a compound action which is highly desirable. In this respect, when it is subjected to impact, it not only compresses, but also bows outwardly to the position of FIG. 2. This will provide excellent impact attenuation, or a relatively soft ride, when only the member 19 is being subjected to loading. However, eventually a point will be reached where undersurface 36 engages piston top 37 whereupon a combined energy absorption of elastomeric member 19 and liquid energy absorber member 15 is obtained to absorb the major portion of the impact without excessive pitching, that is, without excessive spring travel, and this is represented by line AB of graph portion 40. After the force reaches a predetermined value at B, the deflection will continue between points B and C, and after the force is relieved, the deflection will follow the curved portion CA back to point A, and thereafter after the underside of frame 36 leaves piston top 37, the elastomeric member 19 will expand along curved portion AO.

The foregoing combined action of annular member 19 and energy absorber member 15 provides a high spring rate and short travel. This in turn eliminates sidesway and also cushions the bumps to which the platform truck is subjected. Furthermore, the liquid energy absorber device provides the desired type of action, as described relative to FIG. 4, in a very limited space. In this respect, the annular member 19 has a diameter of 3.5 inches and a length of about 5 inches, and the remainder of the components are drawn to scale.

It is to be especially noted that while the liquid energy absorber device has been described with respect to an industrial inplant truck, it will be appreciated that it can be utilized in any environment wherein the above-described type of combined action of the elastomeric member 19 and the liquid energy absorber member 15 is desired. Furthermore, while a specific construction has been disclosed for effecting cooling, it will be appreciated that alternate arrangements may serve the same purpose.

While preferred embodiments of the present invention have been disclosed, it will be appreciated that the present invention is not limited thereto but may be otherwise embodied within the scope of the following claims.

What is claimed is:

1. A liquid energy absorber device comprising an elongated liquid energy absorber member having a casing and a piston movable into and out of said casing, an annular elastomeric member surrounding said casing of said liquid energy absorber member in an axial direction for substantially the entire length thereof, means at opposite end portions of said elastomeric member for receiving varying forces due to changes in external loading on said liquid energy absorber device, said casing of said liquid energy absorber member and said annular elastomeric member having a variable size space formable therebetween as a result of distortion of said elastomeric member resulting from said changes in loading thereon with said space being of increased size when said elastomeric member is distorted and being of decreased size when it is not distorted, and duct means for conducting air into said variable size space from the atmosphere in response to the increasing in size of said space upon the distortion of said elastomeric member for cooling said liquid energy absorber member and said elastomeric member and for conducting air from said variable size space in response to the decreasing in size of said space.

2. A liquid energy absorber device as set forth in claim 1 wherein said elastomeric member is of greater axial length than said liquid energy absorber member, whereby loading is applied first to said elastomeric member and thereafter to said liquid energy absorber member.

3. A liquid energy absorber device as set forth in claim 1 wherein said duct means include ducts extending axially of said casing of liquid energy absorber member.

4. A liquid energy absorber device as set forth in claim 1 wherein said liquid energy absorber device includes first and second ends, a base member, and means for securing said liquid energy absorber member to said base member at said first end.

5. A liquid energy absorber device as set forth in claim 4 including a sleeve extending axially along said liquid energy absorber member and positioned between said liquid energy absorber member and said elastomeric member, a load receiving plate connected to said sleeve and mounting on said elastomeric member at said second end, said duct means including ducts in said sleeve facing said liquid energy absorber member to conduct atmospheric air along said liquid energy absorber member.

6. A liquid energy absorber device as set forth in claim 5 wherein said elastomeric member extends outwardly beyond said liquid energy absorber member at said second end whereby loading is applied first to said elastomeric member and thereafter to said liquid energy absorber member.

7. A liquid energy absorber device comprising an elongated liquid energy absorber member, an annular elastomeric member surrounding said liquid energy absorber member in an axial direction, said liquid energy absorber member and said annular elastomeric member having a variable size space formable therebetween as a result of distortion of said elastomeric member resulting from the changes in loading thereon, and duct means for effecting communication between said space and the atmosphere for causing air to be pumped between the atmosphere and said variable size space in response to the distortion of said elastomeric member for cooling said liquid energy absorber member and said elastomeric member, a cylindrical sleeve extending axially of said liquid energy absorber member for a substantial length of said liquid energy absorber member and positioned between said liquid energy absorber member and said elastomeric member, and said duct means including ducts in said cylindrical sleeve, whereby atmospheric air is pumped through said ducts along said liquid energy absorber.

8. A liquid energy absorber device as set forth in claim 7 including a slidable connection between said cylindrical sleeve and said liquid energy absorber member.

9. A liquid energy absorber device as set forth in claim 7 wherein said elastomeric member is of greater axial length than said liquid energy absorber member, whereby loading is applied first to said elastomeric member and thereafter to said liquid energy absorber member.

10. A liquid energy absorber device as set forth in claim 7 wherein said cylindrical sleeve includes an outer surface facing said elastomeric member and an inner surface facing said liquid energy absorber member, and wherein said ducts comprise a plurality of grooves in said internal surface.

11. A liquid energy absorber device as set forth in claim 7 wherein said elastomeric member includes first and second ends, a plate connected to said sleeve and mounted on said first end of said elastomeric member, and wherein said duct means comprises at least one first duct in said plate and at least one second duct in said sleeve in communication with said first duct for effecting communication between the atmosphere and said variable size space, and a slidable connection between said sleeve and said liquid energy absorber member.

12. A liquid energy absorber device as set forth in claim 11 wherein said elastomeric member is of greater axial length than said liquid energy absorber member, whereby loading is applied first to said elastomeric member and thereafter to said liquid energy absorber member.

13. A liquid energy absorber device as set forth in claim 12 wherein said sleeve includes an end portion which is axially spaced from said second end.

14. A liquid energy absorber device as set forth in claim 11 wherein said cylindrical sleeve includes an inner surface facing said liquid energy absorber member and an outer surface facing said elastomeric member, and wherein said duct means which comprises at least one second duct in said sleeve comprises a plurality of grooves in said inner surface of said sleeve.

15. A liquid energy absorber device as set forth in claim 11 including a base member located proximate said second end, and means for securing said liquid energy absorber member to said base member.

16. A liquid energy absorber device as set forth in claim 15 wherein said elastomeric member is of greater axial length than said liquid energy absorber member, whereby loading is applied first to said elastomeric member and thereafter to said liquid energy absorber member.

* * * * *